P. J. JEWETT.

ROAD GRADING MACHINE.

APPLICATION FILED NOV. 9, 1908.

Reissued Apr. 12, 1910. 13,101.

Witnesses

J. M. Fowler Jr.

L. L. Morrill

Inventor

Parley J. Jewett

By Mason Fenwick & Lawrence

Attorneys

UNITED STATES PATENT OFFICE.

PARLEY J. JEWETT, OF BUTLER, MISSOURI.

ROAD-GRADING MACHINE.

13,101. Specification of Reissued Letters Patent. Reissued Apr. 12, 1910.

Original No. 895,271, dated August 4, 1908, Serial No. 429,658. Application for reissue filed November 9, 1908. Serial No. 461,839.

*To all whom it may concern:*

Be it known that I, PARLEY J. JEWETT, a citizen of the United States of America, residing at Butler, in the county of Bates and State of Missouri, have invented new and useful Improvements in Road-Grading Machines, of which the following is a specification.

This invention relates to road grading machines, and one of the principal objects of the same is to provide a simple, cheap, light and conveniently operated device for surfacing roads and for grading from the ditches upon opposite sides of the road toward the center.

Another object is to provide a light machine for scraping the furrow slice after the ditching plow has been used to carry the dirt over toward the center of the grade to distribute the earth gradually and form a proper grade for the road.

A further object of the invention is to provide improved means for accommodating the driver operating the improved grader.

Another object is to provide improved means for elevating the grader above the ground to prevent its engagement with and operation upon the ground.

Another object of the invention is to provide improved means for guiding and controlling the movement of the improved grader.

These and other objects may be attained by means of the construction illustrated in the accompanying drawing, in which:—

Figure 1:
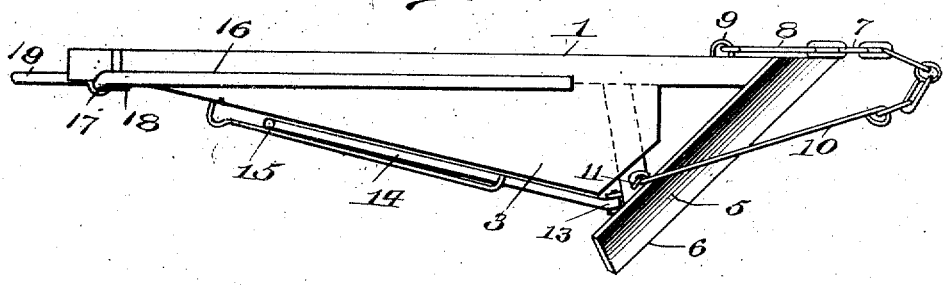
Figure 2:
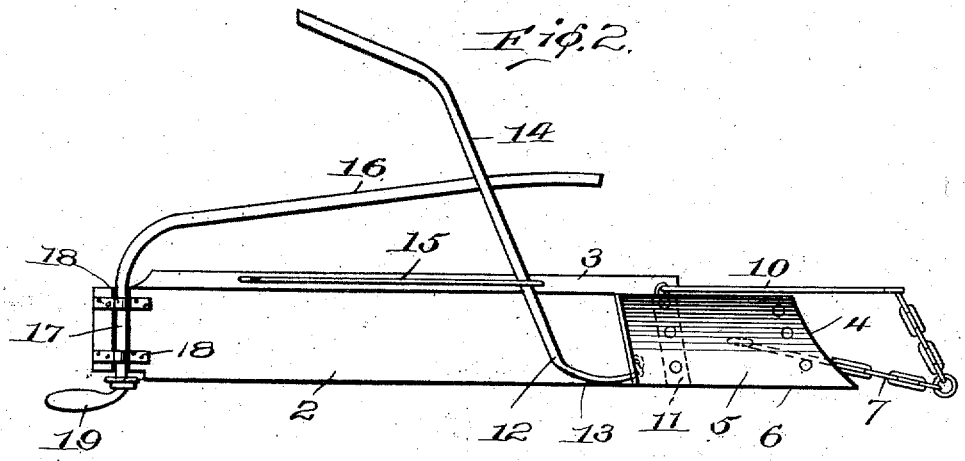

Figure 1 is a plan view of a road scraper and grader made in accordance with my invention. Fig. 2 is a side view of the same.

Referring to the drawing for a more specific description of my invention, 1 designates the frame of the machine consisting of a land side 2 and a base or platform 3. The front end of the land side 2 is cut on a bevel, as at 4, and the mold board 5 is secured to said land side with the edge of the mold board flush with the end of said land side. The mold board is provided with a scraping edge 6 which lies in substantially the same horizontal plane as the bottom of the land side 2, said mold board being slightly curved to carry the dirt over to the right as it is moved along.

The draft device for my grader consists of a chain 7 connected by a link 8 to a staple 9 secured to the land side and a long link 10 connected to a brace 11 extending from the mold board to the land side. This chain permits the connection of the draft animals at various points to give the required draft anchor. Connected to the mold board near the bottom edge is a lever 12, said lever having a rounded bearing portion 13 and a long handle portion 14 held in a keeper 15 secured at the side of the platform 3. This lever, when depressed, tips the mold board slightly upward for the purpose of passing over certain portions of the earth without carrying it in front of the mold board for use in distributing the dirt, as is necessary in some classes of grading.

A rudder or steering device consists of a long lever 16 bent downward at 17 and journaled in keepers 18 at the rear end of the grader, said rudder having a blade 10 at its rear end. This blade penetrates the earth a slight distance and holds the plow from sluing about at the rear end.

In operation, the driver may stand upon the platform 3 and may operate the levers 14 and 16 whenever required.

From the foregoing it will be obvious that my invention is of simple construction, is light of draft, can be easily operated by a single person and has been found very efficient and desirable for its purpose.

In transporting the machine from place to place without injury to the grade or grader the rudder may be turned stem backward and the machine inverted by turning it to the left and dragging it upon its back.

Having thus described the invention, what is claimed as new, is:—

1. A grading device comprising a land side bar, a platform secured to said land side, a mold board connected to the front end of said land side, a draft device connected to said grader, a lever for adjusting the mold board vertically, and a rudder for preventing the machine from switching or sluing upon the road.

2. In a machine of the character described, a land side, a mold board, a lever pivotally connected to the mold board, and a keeper through which said lever passes, said lever adapted to be operated to raise the mold board off the ground to permit the dirt to pass under the same.

3. In a device of the class described, a landside, a mold board secured to the landside at an angle, a platform secured in the angle between the landside and mold board and tapering toward the rear end of the landside, an earth-engaging device pivotally connected with the mold board adjacent the end opposite the landside, a lever carried by the earth-engaging device and extending beside of and above the platform, a keeper for the lever carried at the edge of the platform, and a steering device pivoted at the rear of the landside.

4. In a device of the class described, a landside, a mold board secured to the landside at an angle, a platform secured in the angle between the landside and mold board and tapering toward the rear end of the landside, an earth-engaging device pivotally connected with the mold board adjacent the end opposite the landside, a lever carried by the earth-engaging device and extending upwardly beside the tapering side of the platform, a keeper for the lever carried at the edge of the platform, a steering device pivoted at the rear of the landside, and a tiller carried by the steering device and extending above the platform adjacent the lever.

5. In a device of the class described, a landside, a mold board secured to the landside at an angle, a platform secured in the angle between the landside and the mold board, and tapering toward the rear of the landside, an earth-engaging device carried adjacent the forward end of the platform, a lever carried by the earth-engaging device and extending upwardly by the side of and above the platform, a keeper for the lever carried by the edge of the platform, a steering device pivoted at the rear of the platform, and a tiller carried by the steering device and extending above the platform adjacent the lever.

In testimony whereof I affix my signature in presence of two witnesses.

PARLEY J. JEWETT.

Witnesses:
W. F. Duvall,
W. D. Yates.